(12) United States Patent
Green

(10) Patent No.: US 6,476,082 B1
(45) Date of Patent: Nov. 5, 2002

(54) MAGNESIUM AMMONIUM PHOSPHATE HEXAHYDRATE SLURRY

(75) Inventor: J. Richard Green, Plainview, TX (US)

(73) Assignee: Magline, Inc., Plainview, TX (US)

( * ) Notice: Subject to any disclaimer, the term of this patent is extended or adjusted under 35 U.S.C. 154(b) by 70 days.

(21) Appl. No.: 09/641,110

(22) Filed: Aug. 17, 2000

(51) Int. Cl.$^7$ .................... B01F 3/12; C01B 25/26; C05G 5/00
(52) U.S. Cl. .................. 516/88; 71/33; 71/36; 71/42; 71/64.08; 423/306
(58) Field of Search .............. 516/88; 71/33, 71/36, 42, 64.08; 423/306; 435/404, 431

(56) References Cited

U.S. PATENT DOCUMENTS

| | | | | |
|---|---|---|---|---|
| 3,126,254 A | * | 3/1964 | Salutsky et al. | 423/306 |
| 3,141,732 A | * | 7/1964 | McCullough et al. | 423/306 |
| 3,320,048 A | * | 5/1967 | Legal et al. | 71/33 |
| 3,384,451 A | * | 5/1968 | Volz | 423/306 |
| 3,459,530 A | * | 8/1969 | Hudson | 71/33 |
| 3,476,510 A | * | 11/1969 | Kern et al. | 423/306 |
| 3,585,020 A | * | 6/1971 | Legal, Jr. et al. | 71/36 |
| 4,013,443 A | | 3/1977 | Schuman | 71/31 |
| 4,153,441 A | | 5/1979 | Guithues et al. | 71/34 |
| 4,402,986 A | | 9/1983 | Sinkoff et al. | 426/41 |
| 4,436,555 A | | 3/1984 | Sugama et al. | 106/690 |
| 4,457,773 A | | 7/1984 | Sley | 71/33 |
| 4,460,555 A | | 7/1984 | Thompson | 423/309 |
| 4,777,026 A | | 10/1988 | Griffith | 423/305 |
| 5,294,348 A | | 3/1994 | Horny et al. | 210/724 |
| 5,613,465 A | | 3/1997 | Moore | 119/230 |

FOREIGN PATENT DOCUMENTS

BE 692895 7/1967

OTHER PUBLICATIONS

PCT/US01/25666 International Search Report dated Dec. 18, 2001.
Database WPI week 198652, London: Derwent Publications Ltd., AN-1986-345802, Class C04, SU 1234362 (KALU-R) abstract.

* cited by examiner

Primary Examiner—Daniel S. Metzmaier
(74) Attorney, Agent, or Firm—Baker Botts LLP

(57) ABSTRACT

A magnesium ammonium phosphate slurry and method of producing magnesium ammonium phosphate slurries. The method provides for obtaining a magnesium hydroxide supply having a small particle size of about 1 to 2 microns. Aqua ammonia and phosphoric acid are sequentially added while maintaining the temperature at below 110° F. The magnesium ammonium phosphate slurry formed has a small particle size of about 2 to 5 microns.

15 Claims, 1 Drawing Sheet

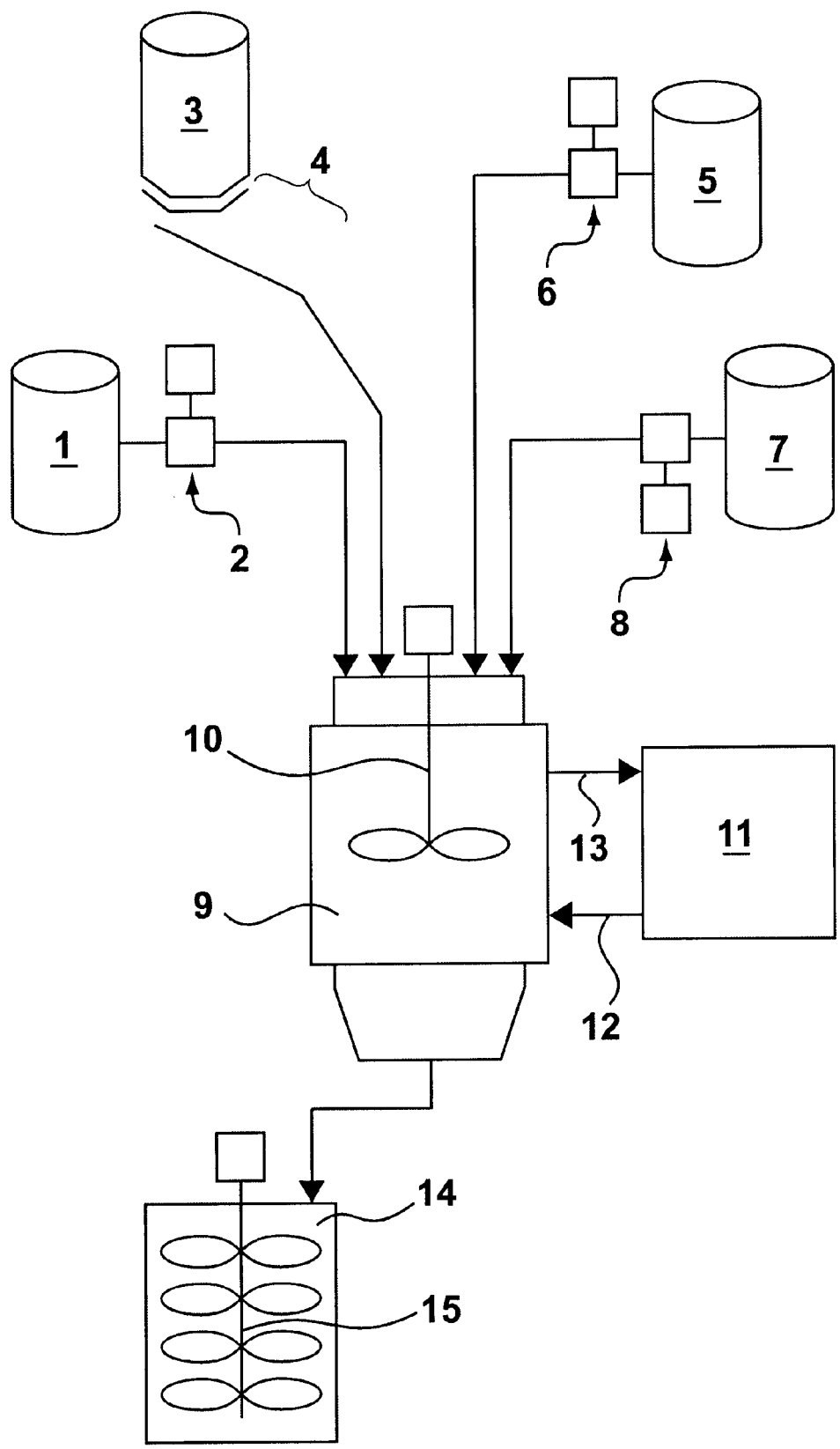

MAGNESIUM AMMONIUM PHOSPHATE HEXAHYDRATE SLURRY

BACKGROUND OF THE INVENTION

1. Field of the Invention

The present invention relates to the production of magnesium ammonium phosphate slurries. More particularly, the invention relates to magnesium ammonium phosphate hexahydrate slurries having a particle size of about 2 to 5 microns.

2. Description of the Related Art

Magnesium ammonium phosphate is a known, naturally occurring mineral ("struvite"). The production of solid forms of magnesium ammonium phosphate are known and are used for purposes such as fertilizer, nutrients for cultured growths, treatment of waste water, and treatment of animal waste. For these uses, the magnesium ammonium phosphate is usually manufactured and supplied in dry granular form. The dry granular form may be used for a number of purposes, e.g., broadcast as a fertilizer.

Magnesium ammonium phosphate has a low solubility in water and the dry granular magnesium ammonium phosphate may be dispersed in water to produce a slurry. In the past, all known slurries of magnesium ammonium phosphate have a particle size of at least about 10 microns or larger. There are a number of shortcomings with slurries having this particle size, e.g., the magnesium ammonium phosphate settles out of suspension, poor consistency when dispersed, and poor control over reactions when magnesium ammonium phosphate is a reactant.

SUMMARY OF THE INVENTION

Accordingly, a need has arisen for a magnesium ammonium phosphate hexahydrate slurry having a particle size of about 2 to 5 microns. This significantly reduces settling and provides for improved consistency and reaction with other compounds.

In accordance with the present invention, a method of producing a magnesium ammonium phosphate hexahydrate slurry is provided that significantly reduces the particle size and thereby improves the settling, consistency and reaction with other compounds. The process is composed of the following steps: first, using a magnesium hydroxide supply having very small particle size, a water/magnesium hydroxide slurry is formed. Second, an ammonium source is added. Third, while maintaining an ammonia excess and controlling the temperature to a maximum of about 110° F., phosphoric acid is added.

Accordingly, an object of the present invention is to provide a magnesium ammonium phosphate hexahydrate slurry having a particle size in the 2 to 5 micron range which provides for the advantages of reduced settling, improved consistency when dispersed and improved reaction with other compounds.

BRIEF DESCRIPTION OF THE DRAWINGS

A better understanding of the invention can be obtained when the detailed description of exemplary embodiments set forth below is considered in conjunction with the attached drawing in which:

The FIGURE is a simplified process flow diagram showing the inventive process for the production of the unique magnesium ammonium phosphate hexahydrate slurry.

DETAILED DESCRIPTION OF THE EXEMPLARY EMBODIMENTS

1. Starting Materials

It is important that the magnesium hydroxide powder obtained has a particle size of generally of 1 to 2 microns. Such a magnesium hydroxide may be purchased from Martin Marietta of Manistee, Mich. as MAGSHIELD UF.

The ammonia starting material is preferably an aqua ammonia (ammonium hydroxide) solution. These solutions are generally commercially available in concentrations of from about 19 wt. % to about 29 wt. %; preferably, the concentration is about 29 wt. %.

The phosphate starting material is preferably a phosphoric acid solution. Phosphoric acid is commercially available in a wide range of concentrations; preferably, the concentration is about 75 wt. %.

For all of the above listed starting materials, it is preferred that the materials be purchased without additives, e.g., surfactants, emulsifying agents, etc.

The water may be from any convenient source. It is preferred not to use chlorinated water.

2. Process

The FIGURE shows a simplified process flow diagram of the process of the present invention which includes as the main reactor, jacketed reactor 9. Jacketed reactor 9 is first supplied with water which may be pumped from water tank 1 using water pump 2 to initially charge jacketed reactor 9. It is preferred not to use chlorinated water. The amount of water may be adjusted as required to provide the preferred solids content of about 33 wt. % to about 42 wt. % in the slurry product depending upon the concentration of the other starting materials, particularly the ammonia and phosphoric acid.

Next, magnesium hydroxide powder is added from storage hopper 3 through metering transfer facilities 4 into jacketed reactor 9. The magnesium hydroxide powder should be added to the water then mixed utilizing high shear mixing with cooling water being supplied to jacketed reactor 9.

Unless special procedures are used during the manufacture of the magnesium hydroxide, the magnesium hydroxide is supplied in a particle size of at least about 5 to 6 microns or larger. With this particle size as a starting material, the finished magnesium ammonium phosphate product particle size is found to be much larger.

It is important to use a magnesium hydroxide supply which has a very small particle size in the range of about 1 to about 2 microns. In addition to using dry powder, it is possible to use a magnesium hydroxide slurry, as long as the particles are in the about 1 to about 2 micron size. If a magnesium hydroxide slurry were used, it would be necessary to adjust the initial water charge to provide a final product with about a 35 wt. % solids content.

After the initial charge of magnesium hydroxide, aqua ammonia (ammonium hydroxide) is charged from ammonia tank 5 through metering ammonia pump 6 to jacketed reactor 9. After the initial charge of magnesium hydroxide has begun, the addition of the ammonium hydroxide may be conducted simultaneously with the ongoing addition of magnesium hydroxide as long as adequate mixing is provided, preferably high shear mixing. As an alternative to aqua ammonia, anhydrous ammonia could be used, it would, however, be necessary to adjust the initial water charge to provide a final product with about a 35 wt. % solids content.

After at least about 10% of the ammonium hydroxide has been added and while maintaining an excess of ammonia, phosphoric acid from tank 7 through metering pump 8 is preferably added simultaneously with the ongoing addition of ammonium hydroxide. This addition should be conducted such as to bring the temperature of the reacting mix up to about 105° F. as quickly as possible. During the completion of the phosphoric acid addition, temperatures should be kept in the range of 105 to 110° F., but should not be allowed to exceed 115° F. It is believed that at temperatures above about 120° F., the hexahydrate form of magnesium ammonia phosphate is converted to the monohydrate form. Maintaining the magnesium ammonia phosphate in the hexahydrate form is preferred. The rate of addition of phosphoric acid is limited by the chilled water supply 12 temperature, as well as the heat exchange area of the jacketed reactor 9. The addition of the phosphoric acid causes an exothermic reaction and the produced heat should preferably be removed at a rate sufficient to control the reaction temperature in the range of 105 to 110° F. Jacketed reactor 9 and agitator 10 should be designed to provide suitably high shearing agitation. It is preferred that agitator 10 have high shear knife blades. It has been found that a Littleford Day, Inc. (Florence, Ky.) DAYMAX 10 DISPENSER provides suitably high shear agitation for a 10 gallon batch. The DAYMAX 10 DISPENSER rotor speed is 3600 rpm with a tip speed of 7,000 feet per minute.

Jacketed reactor 9 is supplied with chilled water from a water chiller 11 utilizing chilled water supply 12 and return 13 lines. Preferably, the chilled water temperature should be about 40 to about 45° F. It has been found that for a jacketed reactor 9 having a heat transfer surface of approximately 58 sq. in./gal. that a chiller duty of 5 tons of refrigeration/10 gal. product (0.5 tons/gal.) is suitable.

It is preferable to complete the reaction with a pH of the jacketed reactor 9 solution at about a pH of 6.4–6.5.

After the reaction is suitably complete, the product from jacketed reactor 9 is transferred to the product tank 14 with a stirrer 15 to keep the particles in suspension. Also, stirrer 15 helps the reaction continue to completion. In product tank 14, it is preferable to keep the product magnesium ammonium phosphate slurry at a temperature of 95° or below to prevent caking or crusting of the product as has been observed by the inventor at temperatures of about 110° and above.

In the making of the inventive magnesium ammonium phosphate hexahydrate slurry, it is important to begin with a magnesium hydroxide powder (or slurry) having a small particle size such that the final magnesium ammonium phosphate product particle remains small in size. It is believed that for the process disclosed, a surface reaction occurs on the magnesium hydroxide particles upon the addition of the ammonia and phosphoric acid, and thus, the final product particle size is larger than the initial magnesium hydroxide particle size.

The inventive process may be summarized as follows:

| Material Feed | Conc. | lbs. | wt % |
|---|---|---|---|
| Water | 100% | 54.4 | 59.2 |
| Mg(OH)2 | 100% | 8.3 | 9.0 |
| NH3 | 29% | 10.7 | 11.6 |
| H3PO4 | 75% | 18.6 | 20.2 |
| TOTAL | | 92.0 | 100.0 |

| Time (min) | Procedure | Comments |
|---|---|---|
| 0–3 | initial water charge | |
| 3–6 | all magnesium hydroxide changed | |
| 6–7 | mixing | high shear |
| 7–8 | ammonium feed | |
| 7 1/2–15 | phosphoric acid feed | preferred to have excess of ammonia present during phosphoric acid feed; preferred to limit phosphoric acid feed so as to not exceed 110° F. |
| 16–20 | cooling to 95° F. | |
| 20+ | discharge system | |

These are typical run conditions for a 10 gallon/100 lb. batch made in a DAYMAX 10 DISPENSER. Other size batches could be designed accordingly to meet the general procedures set out above.

For the measurement of particle size, it is preferred to use a polarized light microscope (PLM) with suitable magnification. For example, an analysis using a polarized light microscope was conducted by Breed and McGill, L.L.C. of Muscle Shoals, Ala. The PLM had magnification powers of 100× and 400×. With the PLM used, for the 100×, each division on the scale was 10 microns, and for the 400× each division on the scale was 2.5 microns. This was used to read the longest side of the crystal. The accuracy of this PLM is believed to be within 1 micron of the actual value. The samples were examined in slurry form after shaking and stirring with a spatula and putting a drop on a slide along with a drop of water to disperse the crystals. Additionally, as the magnesium ammonium phosphate particles are locally charged, the particles may attract each other causing agglomerates which need to be broken up, for example, with shear mixing before the measurement of the particle size. For purposes of this patent application, the particle sizes are for the non-agglomerated particles.

In the process of the present invention, the formation of magnesium ammonium phosphate monohydrate and diammonium phosphate also occurs. It is preferred that the production of the monohydrate and diammonium phosphate be minimized, preferably the compounds are present in a combined amount of not more than about 8 wt. % of the slurry. It has been found that the monohydrate form produces more reactor scale and thus reduces heat transfer, causing excessive reaction time and downtime for removing scale.

EXAMPLE 1

| Starting Materials | Conc. | lbs. |
|---|---|---|
| Water | 100% | 54.2 |
| Phosphoric acid | 85% | 17.38 |
| Ammonia | 19% | 13.51 |
| Magnesium hydroxide | 100% | 8.79 |

| Time (Min) | Procedure | Reactor Temp (° F.) |
|---|---|---|
| 0 | Charge water & magnesium hydroxide. Start mixer. | Amb |
| 1 | Begin ammonia addition. | 64 |
| 2 | Ammonia in @ 2'20" | 64 |
| 3 | Start phosphoric add in. | 64 |
| 5 | | 72 |
| 6 | All phosphoric in @ 6'10" | 94 |
| 7 | | 117 |
| 10 | Stop & inspect. Looks good. Discharge | 118 |

All the water was added to the reactor as an initial charge. While maintaining good agitation, the magnesium hydroxide was slurried into the water. With continued agitation, the ammonia was slowly added. There was a slight temperature rise. Next, the phosphoric acid was slowly added to the slurry. A large temperature rise occurred. This reaction resulted in a smooth slurry with very little water separation which is an indication of uniform small particles.

In this example, the mixing was done with a LITTLEFORD DAYMAX DISPENSER (Littleford Day, Inc., Florence, Ky.).

This resulted in a magnesium ammonium phosphate hexahydrate slurry which appeared as a smooth slurry with very little water separation having a specific gravity of 1.16, a pH of 7, with 37.42 wt. % solids in the slurry.

The composition of the magnesium ammonium phosphate hexahydrate slurry was as follows:

| Compound | wt. % in slurry |
|---|---|
| Magnesium (Mg) | 3.71 |
| Nitrogen (N) | 2.14 |
| Phosphate (PO$_4$) | 14.47 |

Thus, the slurry comprises about 3.7 wt. % magnesium, about 2.1 wt. % nitrogen, and about 14.5 wt. % phosphate.

EXAMPLE 2

| Material Feed | Conc. | lbs. |
|---|---|---|
| Water | 100% | 54.4 |
| Mg(OH)2 | 100% | 8.3 |
| NH3 | 29% | 10.7 |
| H3PO4 | 75% | 18.6 |

| Time (Min) | Procedure | Reactor Temp (° F.) | CW fm Jacket (° F.) | CW to Jacket (° F.) |
|---|---|---|---|---|
| 00 | Start Mg(OH)2 Feed | | | |
| 03 | Stop Mg(OH)2 Feed | | | |
| 04 | Start NH3 Feed | 70 | 43.5 | 43.3 |
| 05 | Stop NH3 Feed | | | |
| 06 | Start Phos Feed | 101 | 45.4 | 41.5 |
| 08 | | 105 | 50.1 | 41.3 |
| 10 | | 105 | 53.2 | 42.0 |
| 12 | | 106 | 53.9 | 43.4 |
| 14 | | 106 | 54.8 | 42.8 |
| 16 | | 105 | 55.5 | 43.1 |
| 17 | Finish H3PO4 Charge | 107 | 55.4 | 43.3 |
| 20 | Discharge System | 95 | 54.0 | 43.5 |

Max. Temp. during reaction 107° F.
Product
  Net Wt. 100 lbs.
  Appearance: smooth slurry
  pH 6.6
  SpGr 1.185
  34.7 wt. % solids There are several general observations which may be made from the two examples. In both examples, the product appeared as a smooth slurry with very little water separation. This is an indication of uniform small particles with significantly reduced settling compared with previously known magnesium ammonium phosphate slurries. Also, each of the examples resulted in a slurry of approximately 35 wt. % solids. Example 1 was slightly higher because of the water balance utilized. The procedure utilized in Example 1 was completed in about 10 minutes. This is much faster than the typical procedure noted above and Example 2. This shortened procedure time is due to the Example 1 apparatus having more cooling capacity such that the phosphoric acid could be added faster. Also the temperature was allowed to go above the desired 110° F.

Chemical reaction (curing) takes place for about 5–6 days after production. This is evidenced by a 2–3° F. temperature rise in product tank 14 over the first 24 hour period. Also, over a longer period, the pH typically increases from about 6.5 to about 7.5 which is believed due to magnesium displacing ammonia in diammonium phosphate according to the reaction:

$$Mg(OH)_2 + (NH_4)_2HPO_4 + 4H_2O \rightarrow MgNH_4PO_4 \cdot 6H_2O + NH_3$$

The present inventive product and process is advantageous over known magnesium ammonium phosphate products and processes for the production of magnesium ammonium phosphate as the magnesium ammonium phosphate hexahydrate slurry has significantly smaller particles than known magnesium ammonium phosphate slurries. The slurry of the present invention with the smaller particles significantly reduces settling, improves consistency for dispersion and improves control over reactions with other compounds.

Having described the invention above, various modifications of the techniques, procedures, material, and equipment will be apparent to those skilled in the art. It is intended that all such variations within the scope and spirit of the invention be included within the scope of the appended claims.

What is claimed is:

1. A magnesium ammonium phosphate slurry, comprising:

from about 33 wt. % to about 42 wt. % solid magnesium ammonium phosphate hexahydrate particles, wherein at least about 85 wt. % of the particles have a size from about 2 microns to about 5 microns; and from about 58 wt. % to about 67 wt. % free water, where the slurry has a pH from about 7 to about 7.5.

2. The slurry of claim 1, comprising about 3.7 wt. % magnesium, about 2.1 wt. % nitrogen, and about 14.5 wt. % phosphate.

3. The slurry of claim 1, wherein the slurry further comprises magnesium ammonium phosphate monohydrate and diammonium phosphate present in a combined amount of not more than about 8 wt. % of the slurry.

4. A process for producing a magnesium ammonium phosphate slurry, comprising the steps of:

(a) producing a magnesium hydroxide slurry having magnesium hydroxide particles wherein at least about 85 wt. % of the particles have a size less than about 2 microns;

(b) then adding ammonia; and (c) while maintaining an excess of ammonia and cooling, adding phosphoric acid at a rate so as not to exceed a temperature of about 110° F.

5. The process of claim 4, wherein:

the magnesium hydroxide particles are added in an amount of about 8 wt. % of the final produced magnesium ammonium phosphate slurry product;

the ammonia is added in an amount of about 11 wt. % of the final produced magnesium ammonium phosphate slurry product;

the phosphoric acid is added in an amount of about 19 wt. % of the final produced magnesium ammonium phosphate slurry product.

6. The process of claim 4, further comprising the step of high shear mixing during steps (b) and (c).

7. The process of claim 4, after step (c), further comprising the step of cooling to below about 95° F.

8. A magnesium ammonium phosphate slurry wherein at least about 85 wt. % of the particles have a size from about 2 microns to about 5 microns produced by the process comprising the steps of:

(a) producing a magnesium hydroxide slurry having magnesium hydroxide particles wherein at least about 85 wt. % of the particles have a size less than about 2 microns;

(b) then adding ammonia; and (c) while maintaining an excess of ammonia and cooling, adding phosphoric acid at a rate so as not to exceed a temperature of about 110° F.

9. The magnesium ammonium phosphate slurry of claim 8, wherein:

the magnesium hydroxide particles are present in the magnesium hydroxide slurry in an amount of about 8 wt. % of the produced magnesium ammonium phosphate slurry;

the ammonia is added in an amount of about 11 wt. % of the produced magnesium ammonium phosphate slurry;

the phosphoric acid is added in an amount of about 19 wt. % of the produced magnesium ammonium phosphate slurry.

10. The slurry of claim 8, further comprising the step of high shear mixing during steps (b) and (c).

11. The slurry of claim 8, after step (c), further comprising the step of cooling to below about 95° F.

12. The magnesium ammonium phosphate slurry of claim 8, wherein the slurry comprises:

from about 33 wt. % to about 42 wt. % solid magnesium ammonium phosphate hexahydrate particles, wherein at least about 85 wt. % of the particles have a size from about 2 microns to about 5 microns; and from about 58 wt. % to about 67 wt. % free water.

13. The slurry of claim 8, wherein the slurry has a pH from about 7 to about 7.5.

14. The slurry of claim 8, comprising about 3.7 wt. % magnesium, about 2.1 wt. % 2 nitrogen, and about 14.5 wt. % phosphate.

15. The slurry of claim 8, wherein the slurry further comprises magnesium ammonium phosphate monohydrate and diammonium phosphate present in a combined amount of not more than about 8 wt. % of the slurry.

* * * * *